2,740,726

BULB COATING METHOD

James Thomson Anderson, Rugby, England, assignor to General Electric Company, a corporation of New York; patent dedicated to the Public insofar as it relates to lamps and lamp parts to the extent stated in document recorded in the United States Patent Office, January 4, 1954, Liber U–238, page 394

No Drawing. Application April 11, 1952,
Serial No. 281,891

Claims priority, application Great Britain May 11, 1951

1 Claim. (Cl. 117—46)

This invention relates to methods of, and materials for, coating a surface of a foundation through which light is to be transmitted to produce good diffusion of the light without increasing the absorption to any great extent. Coatings of this type have hitherto been proposed and the material used is often silica in a fine state of subdivision. It is known that silica may be applied to the surface in a number of different ways; for example, by burning an organic silica compound such as ethyl silicate so that the fumes are deposited on the surface, by depositing the silica from a suspension in a liquid, or by applying a coating of silica in a fine solid form in suspension in a lacquer solution and removing the solvent by evaporation and the lacquer by heating or other suitable means.

According to the present invention I produce a coating of silica on the surface of a foundation, such as the interior wall of the glass bulb of an incandescent lamp, by applying to the surface a solution of a resin and a colloidal solution of silica in a suitable solvent such as alcohol or a mixture of solvents, allowing the coating to dry and wholly or in part removing the resin by heat.

The heating process also removes the last remains of the solvents and produces a fine whitish translucent coating of silica, suitable, among other purposes, for the light-diffusion uses mentioned above.

It is essential that the colloidal solution of silica, produced for instance by careful hydrolysis of tetra ethyl silicate, and the resin must be so produced and so dissolved in chosen solvents as to form a homogeneous solution when mixed.

The strength of these solutions, the ratios in which they are mixed, the rate at which the coating is dried, and other factors, will have influences on the amount of silica eventually left behind and some influence on the nature of the final coating.

Some solutions, particularly those having a high resin to silica ratio, may tend to peel off when the solvent is evaporated. Or again, some solution coatings may tend to give rough and uneven coatings during the drying process. These faults may be corrected by the judicious use of plasticizers and special solvents compatible with the other components, for instance butyl phthalate or camphor, and ethyl lactate, respectively.

Resins which may be used include most of those capable of solution in such solvents as alcohol, acetone, aromatic solvents and others which are compatible with the colloidal solution of silica, but I prefer to use those which are easily removable by heat through decomposition or depolymerization, such as nitrocellulose or "Diakon."

In the process of hydrolyzing the ethyl silicate it is also preferable in many cases to use as large a proportion as possible of a solvent which is known to be compatible with the resin it is desired to use.

An advantage of the present method is the improved adherence of the final silica to the base, so that it may be subjected to reasonable handling with safety and may even be used for external coatings of articles desired to be so coated.

When a small resin residue is not harmful, e. g., when the diffusing coating is on the outer surface of a lamp envelope, adhesion may be improved by not removing the whole of the resin.

A further advantage is that the thickness of the silica coating may be controlled within close limits by adjustment of ratios and solvents so as to obtain coatings which appear anything from a dense white to transparent.

The very thin coatings can be so thin as to produce interference colors from reflected light.

Other compounds which are compatible with the other solvents and other materials in the liquid coating mixture may be added. In this way may be added, for instance, materials, soluble in the mixture, which are colored or produce, during the process, materials which are colored, so that the final coating, after firing, may be tinted.

In order that the invention may be readily understood, I will give some examples of the manner in which the invention may be carried out.

First prepare a colloidal solution of silica, to be referred to hereinafter as solution A, in the following manner:

200 cc. of pure tetra ethyl silicate is mixed with 210 cc. of acetone, 38 cc. of distilled water and 2 cc. of dilute hydrochloric acid (10 cc. strong acid in 90 cc. of water) and shaken vigorously. Hydrolysis, accompanied by a rise in temperature, takes place and, on cooling, one has a clear colloidal solution of silica in alcohol and acetone, containing approximately 12 gms. $SiO_2$ in 100 cc. solution.

Then prepare a resin solution, to be called solution B, in the following way:

A polymeric methyl methacrylate resin in powder form, such as that known under the British Registered Trademark Diakon type MC, is dissolved in acetone to give a final concentration of approximately 12 gm. solids per 100 cc. solution.

*Example I*

This gives a typical example of a resin-silica solution. 50 cc. each of solutions A and B are mixed and poured onto a base, such as the inside of a filament lamp bulb. The mixture solution is poured off, allowed to drain and dry. The drying may be accelerated by a draft of air, to give a thicker coating, during the draining process.

The coated base is then raised to a temperature sufficient to remove the resin, leaving an opal-like adherent coating of silica.

*Example II*

Where fairly high ratios of resin to silica are used a plasticizer may be added, e. g., where the resin is of the methyl methacrylate type, either butyl phthalate or camphor may be added up to half the weight of the resin. This tends to avoid stripping of the dried film and gives a rather thinner coating than would be obtained without its use.

*Example III*

5 c. each of solutions A and B and ethyl lactate and 0.3 gm. of camphor give a final coating after firing which is so thin as to be only visible as a result of the interference colors it introduces.

*Example IV*

50 cc. each of solutions A and B have added to them an amount of cobalt chloride $CoCl_2.6H_2O$ depending upon the amount of color required in the final fired coating.

After drying and heating, the final coating is tinted by the cobalt oxide present to a lavender gray.

The solutions A and B above referred to may be modified, in the following way, thus indicating that the given proportions are not critical. For example, the solution A may be modified by using 0.4 cc. of the hydrochloric acid solution (instead of the 2 cc. given above); and the solution B of resin may be modified to give 12 gms. of resin per 100 cc. solution. With these modifications, the proportions of the so-modified solutions A and B may be employed in the manner specified in connection with the preceding examples.

*Example V*

162 cc. of solution B, as above modified, are mixed with 0.3 cc. dilute hydrochloric acid (10 cc. strong acid in 90 cc. water), distilled water 28–30 cc. and 150 cc. tetra-ethyl silicate and the mixture is agitated until a clear solution is obtained. That hydrolysis of the slilicate is occurring is shown by a rise in temperature of the mixture. When cooled, acetone may be added (or it may be added before the hydrolysis) to make up to, say 405 ml. total.

This example shows that hydrolysis of the ethyl silicate and the mixing of the resin may take place simultaneously.

The solution would then contain approximately 10 gms. of silica and 12 gms. of resin per 100 cc. solution. This, with or without dyes or other additions, may be used in one or more of the ways already mentioned.

Another advantage of the above method is that it affords a method of binding other materials to a surface, leaving eventually only that material and silica upon the surface. Owing to the transparency of silica to visible and other radiations it can be used for causing the adherence of fluorescent materials and fine pigments to a suitable base.

What I claim as new and desire to secure by Letters Patent of the United States is:

The method of producing a light-diffusing coating of silica on the surface of a glass electric lamp bulb which comprises preparing a colloidal solution of silica by hydrolysis of a mixture of, by volume, approximately 200 parts tetra ethyl silicate, 210 parts acetone, 38 parts water and 2 parts dilute hydrochloric acid, preparing a resin solution by dissolving a polymeric methyl methacrylate resin in acetone to give a concentration of approximately 12 gms. solids in 100 cc. solution, mixing together approximately equal volumes of the colloidal silica solution and the resin solution, applying the mixture so formed to the surface of the bulb to form a coating thereon, drying the coating, and heating the bulb to a temperature sufficient to remove the resin and leave only an opal-like adherent coating of silica.

References Cited in the file of this patent

UNITED STATES PATENTS

| Number | Name | Date |
|---|---|---|
| 2,151,496 | Beese | Mar. 21, 1939 |
| 2,329,632 | Marsden | Sept. 14, 1943 |
| 2,440,711 | Bechtold | May 4, 1948 |
| 2,442,976 | Heany | June 8, 1948 |
| 2,456,251 | Boughton | Dec. 14, 1948 |
| 2,493,609 | Young | Jan. 3, 1950 |